(No Model.) 2 Sheets—Sheet 1.

T. R. CRANE.
HARROW.

No. 438,405. Patented Oct. 14, 1890.

WITNESSES:
John E. Morris
A. C. Eader

INVENTOR:
Thos R. Crane

BY Chas B. Mann
ATTORNEY.

(No Model.)　　　　　　　T. R. CRANE.　　　2 Sheets—Sheet 2.
HARROW.

No. 438,405.　　　　　　　　　Patented Oct. 14, 1890.

WITNESSES:　　　　　　　　　　INVENTOR:
John E. Morris　　　　　　　　　Thos R. Crane
A. E. Eader
　　　　　　　　　　BY　Chas B. Mann
　　　　　　　　　　　　　　ATTORNEY.

UNITED STATES PATENT OFFICE.

THOMAS R. CRANE, OF HEATHSVILLE, VIRGINIA.

HARROW.

SPECIFICATION forming part of Letters Patent No. 438,405, dated October 14, 1890.

Application filed October 15, 1889. Serial No. 327,089. (No model.)

*To all whom it may concern:*

Be it known that I, THOMAS R. CRANE, a citizen of the United States, residing at Heathsville, in the county of Northumberland and State of Virginia, have invented certain new and useful Improvements in Harrows, of which the following is a specification.

This invention relates to an improved harrow, and is illustrated in the accompanying drawings, in which—

Figure 1:
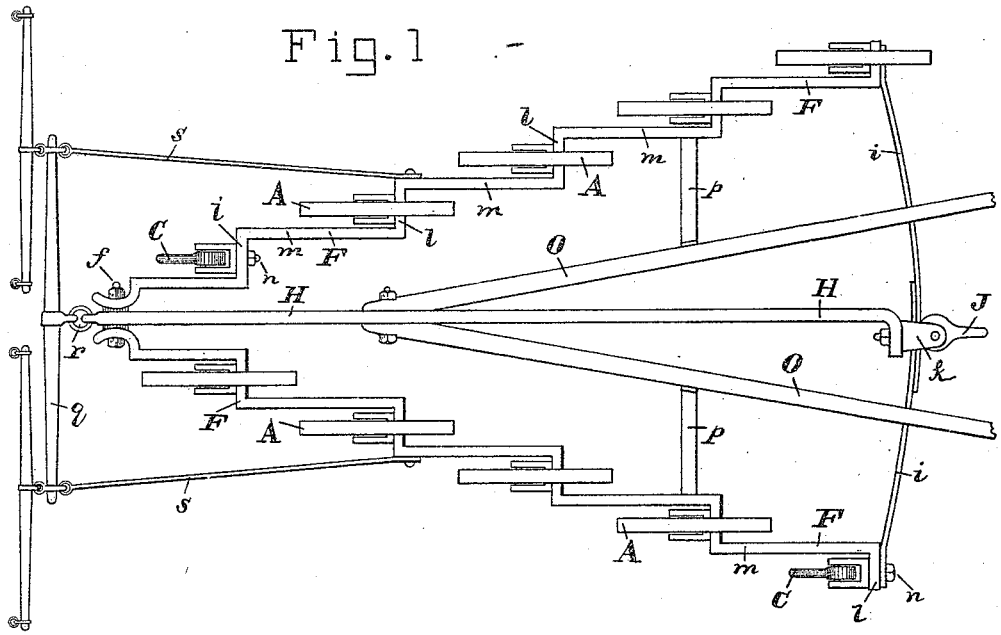
Figure 2:
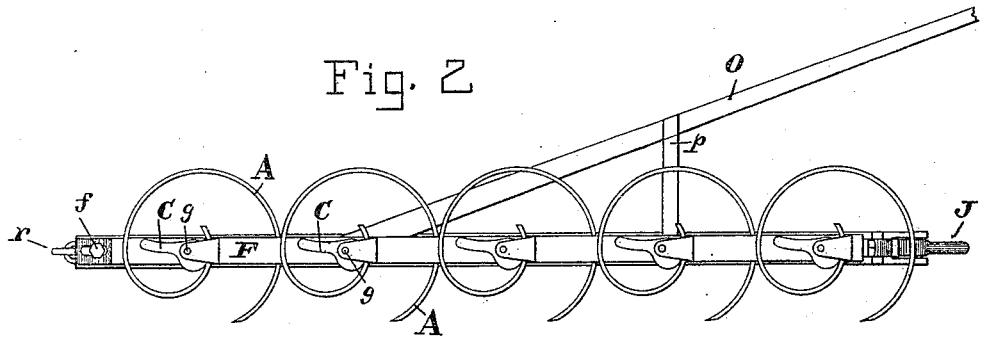
Figure 3:
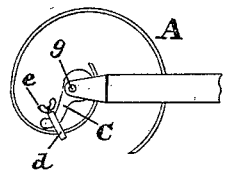
Figure 4:
Figure 5:
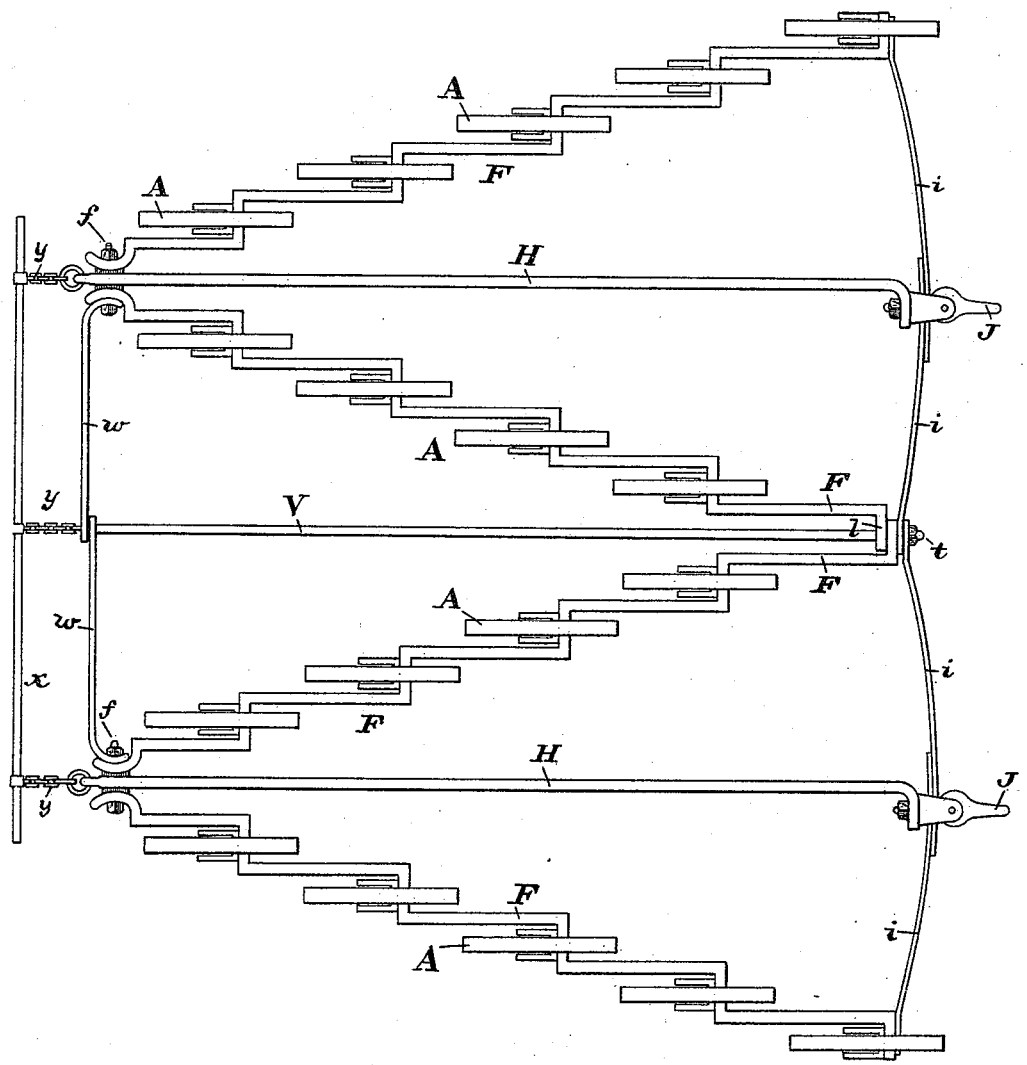

Figure 1 is a top view of the harrow. Fig. 2 is a side elevation of same. Figs. 3 and 4 show the yoke and set-screw for holding the cam-lever. Fig. 5 is a top view of a double harrow and shows the parts employed for connecting two harrows.

In this harrow I use a curved spring-tooth and cam-lever of the kind shown in Letters Patent No. 402,000, granted me April 23, 1889.

The letter A designates the curved spring-teeth, C the cam-lever, and $g$ its pivot. Each tooth is held by one of the cam-levers.

For the purpose of securely holding the cam-lever and preventing it from accidentally loosening its grip on the tooth I employ a clip-yoke and screw. (See Figs. 3 and 4.) The yoke $d$ is loose around the spring-tooth and slips over the arm of the cam-lever C. A set-screw $e$, which is carried on one side of the yoke, has its end impinging on the tightened cam-lever and effectually prevents it from moving. It is obvious the set-screws $e$ may be dispensed with and merely the yoke employed, as a yoke alone properly fitted would prevent the cam-lever from moving.

For using the harrow with the teeth pointing downward to take into the ground this yoke and set-screw are not needed; but when the harrow is reversed or turned upside down, so that the round curved top of the teeth will drag on the surface of the ground, the cam-levers then are liable to unloose, because in this position the draft of the teeth tends to loosen the cams instead of tighten them.

Two teeth-supporting bars F have their forward ends secured by a bolt $f$ to a central longitudinal draft-bar H. From their front ends, which are close together, the teeth-bars F extend rearward in an oblique manner and so as to spread away from each other, and each bar at its rear end has attached a spread-rod $i$, and the two spread-rods extend toward and overlap each other at the center, where they are clamped by a suitable clamp device, which firmly holds both of them. In the present instance the two spread-rods $i$ are slightly curved, and the clamp device consists of a cam-lever J, pivoted between the two jaws $k$ of a box, which is secured at the rear end of the draft-bar H, which is bent laterally at substantially right angles thereto and preferably perforated, the box being preferably provided with a threaded shank, which passes through the perforation. The two spread-rods $i$ pass through the clamp-box and between its upper and lower jaws $k$, and the cam-lever J holds both rods $i$. This construction allows the width of the harrow at the rear to be adjusted. As will be seen, the rear ends of the teeth-bars F may be moved farther apart or brought closer together.

The teeth-bars F have a series of angles, which form lateral seats $l$ and longitudinal reaches $m$. On each seat $l$ one of the boxes of the tooth-holding cam-levers are secured by a bolt and nut $n$, and the reaches $m$ extend straight back from the outer side of one seat to the inner side of the next seat. The seats $l$ are preferably perforated for the passage of the bolt $n$. This enables the outer ends of the rods $i$ to be secured to the frames by the same bolt that holds the box for clamping the tooth in place without any additional means of securement than is already provided for securing the tooth.

Handles O are attached by one end to the draft-bar H, and each handle is supported by a side brace-bar $p$, connected with one of the teeth-bars F.

At the front a doubletree $q$ is attached to the draft-bar by a ring $r$ and to each tooth-bar by a connecting-rod $s$. This is the arrangement for a single harrow.

Where a double harrow is used, as in Fig. 5, the rear ends of the adjoining teeth-bar F of two harrows are coupled together in a suitable manner, as at $t$. In the present instance this coupling is made by the end lateral seat $l$ of one bar overlapping the end seat of the other bar, a pivot-bolt $t$ passed longitudinally through both seats, thus making a flexible joint which will rise or fall.

A central draft-beam V extends between the two harrows, and the pivot-bolt t, already referred to, is at the rear end of this beam. At the front end are two side rods w, both jointed to the draft-beam V and each extending in an opposite direction to the front bolt f of the two harrows. The front rods w, being jointed to the beam V, form thereat a flexible joint, which acts similarly to the rear pivot t.

A cross-bar x is connected to the two harrows by short chains y, and the draft-animals are attached to the said cross-bar.

Having described my invention, I claim—

1. In a harrow, the combination of a curved spring-tooth, a cam-lever to hold said tooth, and a yoke or clip around the tooth and the arm of the cam-lever to prevent the latter from accidentally loosening.

2. In a harrow, the combination of a curved spring-tooth, a cam-lever to hold said tooth, a yoke or clip around the tooth and the arm of the cam-lever, and a set-screw carried on the yoke, for the purpose set forth.

3. In a harrow, the combination of two tooth-supporting bars F, having angles with lateral perforated seats l and having their forward ends secured close together and their rear ends extending obliquely and spreading away from each other, a spring-tooth held to each seat, a central longitudinal draft-bar between said tooth-bars, a clamp-box at the rear end of the central bar, and two spread-rods i, each attached to the rear seat of a different one of the angled tooth-bars and having their ends in the said clamp-box.

4. In a harrow, the combination of a central draft-bar H, having its rear end bent laterally at an angle thereto, a clamp-box secured to the bent portion of the bar, two zigzag or angled tooth-supporting bars F, having their forward ends secured by a bolt g to the said central bar and their rear ends extending obliquely and spreading away from each other, a spring-tooth held to a seat on each angle, and a spread-rod attached to the rear seat of each zigzag bar and secured in the said clamp-box on the central bar.

5. In a harrow, the combination of multiple supporting bars or frames F, each having laterally-projecting perforated seats, a box secured to each seat by means of a bolt and a nut, a tooth in each box, two overlapping spread-rods secured at their outer ends to the rear seats of each bar, and means for securing the front ends and operating the harrow.

In testimony whereof I affix my signature in the presence of two witnesses.

THOMAS R. CRANE.

Witnesses:
JOHN E. MORRIS,
JNO. T. MADDOX.